United States Patent [19]

Husges et al.

[11] 4,258,872

[45] Mar. 31, 1981

[54] CONTROLLABLE THREAD EXTRACTOR DEVICE WITH AN AIR PASSAGE CONNECTED TO A VACUUM SOURCE

[75] Inventors: Gerd Husges; Walter Mayer, both of Ingolstadt, Fed. Rep. of Germany

[73] Assignee: Schubert & Salzer, Ingolstadt, Fed. Rep. of Germany

[21] Appl. No.: 968,487

[22] Filed: Dec. 11, 1978

[30] Foreign Application Priority Data

Dec. 24, 1977 [DE] Fed. Rep. of Germany ....... 2757976

[51] Int. Cl.³ ............................................ B65H 51/16
[52] U.S. Cl. ...................................... 226/91; 226/97; 251/65
[58] Field of Search ......................... 226/91, 97, 95, 7; 57/279, 280, 305; 251/65; 137/DIG. 2

[56] References Cited

U.S. PATENT DOCUMENTS

| 2,576,168 | 11/1951 | Allen | 251/65 X |
|---|---|---|---|
| 3,212,539 | 10/1965 | Felix | 251/65 X |
| 3,212,751 | 10/1965 | Hassa | 251/65 |
| 3,688,957 | 9/1972 | Beddoe | 226/97 |
| 4,018,419 | 4/1977 | Monpetit | 251/65 |
| 4,083,171 | 4/1978 | Konig et al. | 57/34 R |

FOREIGN PATENT DOCUMENTS 968487  2/1956  Fed. Rep. of Germany .
2543986  4/1977  Fed. Rep. of Germany .

Primary Examiner—Stanley N. Gilreath
Attorney, Agent, or Firm—Bailey, Dority & Flint

[57] ABSTRACT

The present invention relates to a controllable thread extractor with an air passage connected to a vacuum source which includes a shaft passageway perpendicular to the air passage dividing the air passage into two sections, a ball is received in the shaft and means for actuating the ball to selectively open and close the air passage.

9 Claims, 6 Drawing Figures

CONTROLLABLE THREAD EXTRACTOR DEVICE WITH AN AIR PASSAGE CONNECTED TO A VACUUM SOURCE

BACKGROUND OF THE INVENTION

Thread extractor devices are used in open-end spinning apparatuses so that with their aid separated thread sections are removed or thread ends retained flexibly. In order to avoid an undesired effect on the threads and unnecessary air consumption, these thread extractors are, as a rule, closable (DT-OS No. 2,543,986). The closure is located in this case at the outer mouth of the thread extractor. If however, the closure portion does not seal perfectly for any reason, a thread section passing near the unsealed point is subjected to suction and becomes caught, as reduced pressure at this point has a highly concentrated action.

If a plurality of spinning stations are to be set in operation after stopping of the machine, it is necessary for this purpose to open the closure of the thread extractors at each spinning station.

The method of controlling the thread extractors by means of valves is also known (DT-PS No. 938,653, DT-OS No. 2, 540,702, FIGS. 6 to 15). In this case however there is a risk of threads becoming caught on the valve or pinched by it, whereby functioning capacity is impaired.

It is therefore the object the present invention to devise a thread extractor device generally of the above kind in such a way that it can be put into and out of operation in a simple manner and is further safe from jamming of the thread, wherein the device according to the invention is to be of simple construction. In further development of the invention, the device according to the invention should be constructed so as to open automatically when the machine switches off.

SUMMARY OF THE INVENTION

This object is achieved according to the invention by the air passage being divided by a shaft having a passageway arranged essentially perpendicularly to the air passage which receives a ball. The shaft divides the air passage into a first portion connected to the vacuum source having formed at its end facing towards the shaft a seat for the ball, and a second portion for receiving the thread. The shaft extends beyond the air passage on one side essentially by the dimension of the ball diameter and is covered at each of its two ends by means of a closure. Actuating means can be brought into operation on the ball through the closure means in order to move the ball alternately into a closed position in abutment with the seat or into an open position in the shaft, wherein the ball is retained by retaining means. If the ball is moved into the air passage, it passes into the air stream produced by the vacuum source, is applied to the seat and hence closes the air passage, in which position it is held by the prevailing reduced pressure. If the ball is moved out of the air stream and held outside the air stream, the thread extractor is ready for operation. Since the ball has only point contact with the guide walls of the shaft and is moved not parallel but perpendicularly to the sealing surface formed by the seat or rolls over the latter, jamming of the thread is effectively avoided.

According to a preferred embodiment, the air passage is arranged eccentrically in a tubular housing which is traversed completely by the shaft. The device according to the invention may be actuated in any manner, e.g. electromagnetically; an embodiment of the invention of very particular advantage is one in which the air passage is arranged essentially horizontally and the shaft essentially vertically and the retaining means is the force of gravity acting on the ball, and in which the two closures are elastic and the actuating means are formed by control levers, of which one control lever can be brought into operation on the ball through the upper and the other control lever through the lower closure. If the ball is moved downwardly out of the air stream in this embodiment, it drops down completely. As the retaining means is provided by force of gravity, this embodiment is particularly advantageous. If the machine is switched off, no reduced pressure is effective any longer either, so that the ball drops down into the shaft due to force of gravity. If the machine is set in operation again later, then the thread extractors of all the spinning stations are already ready for operation.

Advantageously, the control levers are connected to each other controlwise, which is achieved most easily by the control levers being connected to each other mechanically. If the ball is moved mechanically out of the air passage downwards into the shaft, then the ball must be moved out of the air stream. For this purpose a slightly longer feed path is required, as otherwise the ball is located so far in the air stream that it is pulled into the closed position again. In order to increase the durability of the upper closure, which is subjected to a particularly high load, according to the invention, a closure bulge is directed outwardly with respect to the shaft and is invertible into the shaft by the actuating means. In an embodiment of the object of the invention of this kind, opening of the thread extractor is further facilitated in that the shaft widens upwardly on its side facing towards the first portion of the air passage and the bulge can be brought into abutment with the ends of the second portion of the air passage facing towards the shaft during inversion. In a simple embodiment of the device according to the invention, the air passage and the shaft are arranged in a housing and the two closures form part of a sleeve surrounding the housing.

The device according to the invention is very simple in construction and in operation and thereby reliable in functioning. Further this device is also particularly suitable for use in conjunction with automatic devices.

BRIEF DESCRIPTION OF THE DRAWINGS

Below, the thread extractor according to the invention is described in more detail, wherein only the parts required for comprehension are shown.

DESCRIPTION OF A PREFERRED EMBODIMENT

Figure 1:
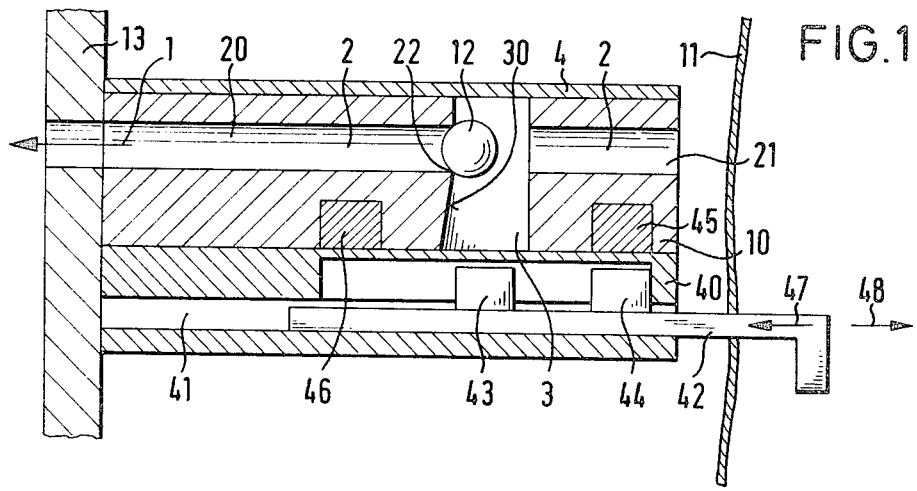
FIG. 1 shows a first embodiment of the thread extractor according to the invention in section with magnetic ball control means.

The controllable thread extractor shown in FIG. 1 is attached to a support 13, e.g., a suction air duct, and comprises an air passage 2 which is connected to a vacuum source (not shown) symbolized by an arrow 1 and which is disposed in a housing 10. The air passage 2 is arranged normally horizontally, as it is generally arranged perpendicularly to the normally vertical thread path. Should the thread path vary for any reason, then the air passage 2 too may conform therewith in a different orientation varying from the horizontal. The air passage 2 is divided by the passageway of an essentially transversely extending shaft 3 into a first portion 20 connected to the vacuum source and a second portion 21 receiving the thread 11. The shaft 3 receives a ball 12 for which the first portion 20 of the air passage 2 has formed a seat 22 on its facing towards the shaft 3. Preferably at least the first portion 20 of the air passage 2 has a round cross-section, while the shaft 3 comprises on the side facing towards the first portion 20 a plane wall which intersects the air passage 2 perpendicularly, so that seat 22 is formed by the round edge of the end of the air passage 2 facing towards the shaft 3. If the air passage 2 has a non-round cross-section or if the shaft 3 intersects the air passage 2 on its side facing towards the first portion 20 of the air passage at an angle varying from the perpendicular or in the form of a non-planar surface, then the round shape of the seat 22 is to be formed by bevelling or by a suitable insert, in order thus to achieve sealing closure of the thread extractor.

Figure 2:
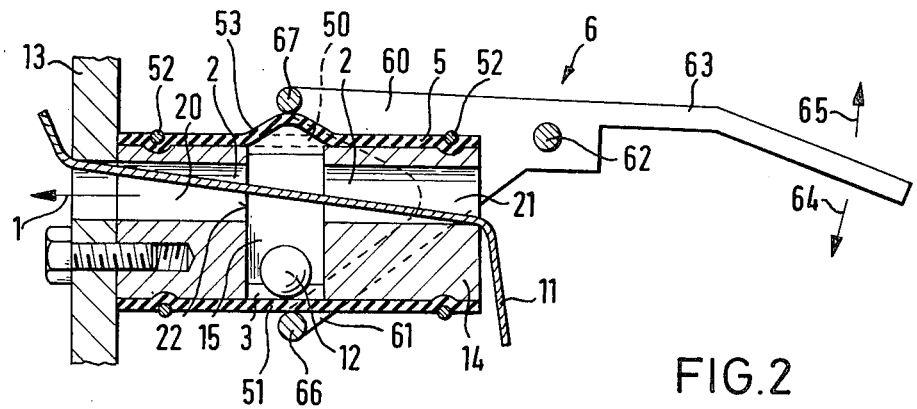
FIG. 2 shows a second embodiment of the thread extractor according to the invention.

As FIG. 2 shows, the shaft 3 extends in at least one direction beyond the air passage 2 essentially by the dimension of the ball diameter. The shaft 3 is covered sealingly at each of its two ends by means of a closure 4 and 40 which may also extend over the whole length of the housing 10. Closure 40 comprises a guide 41 in which is mounted a slide 42 with two differently poled magnets 43 and 44. The closures 4 and 40 and the housing 10 consist of material which is not affected magnetically, while the ball 12 consists of a magnetizable material.

Figure 1A:
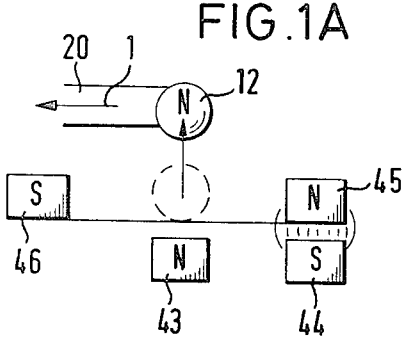
FIGS. 1A and 1B show the function scheme of the device shown in FIG. 1.
Figure 1B:
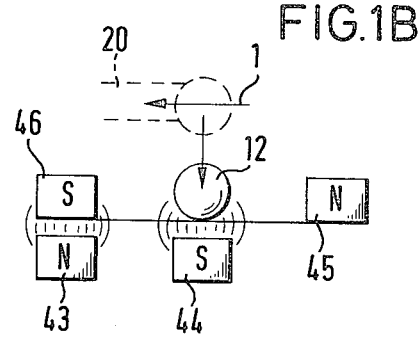

In order to facilitate understanding of the device shown in FIG. 1, the parts which are important for functioning are shown again in FIGS. 1A and 1B, wherein a pole arrangement by way of example is taken as the basis. FIG. 1A corresponds to the closed position of the thread extractor according to the invention shown in FIG. 1.

In FIGS. 1, 1A and 1B, in addition to the magnets 43 and 44 are also shown magnet inserts 45 and 46 in the non-magnetizable housing 10, which may however also be omitted in certain circumstances.

Magnet 43 is poled in the same way as the ball 12; in the example shown, both the ball 12 and magnet 43 (and magnet insert 45) form a north pole N, while magnet 44 (and magnet insert 46) form a south pole S.

In FIGS. 1 and 1A, the ball 12 is repelled by the magnet 43 of like pole and thus passes into the region of the air stream which is acting in the air passage 2, and which moves the ball 12 into abutment with the seat 22 and holds it there, thus sealing off portion 20 from portion 21 of the air passage. If a thread 11 is consequently moved past portion 21, it remains unaffected by the reduced pressure prevailing on the other side of the ball 12.

Magnet 44 is so far removed from the ball 12 that it remains without effect. Where magnet insert 45 is provided, it is neutralized by the latter.

If the slide 42 is displaced in the guide 41 in the direction of arrow 47, magnet 44, which was previously disposed in the region of portion 21 of the air passage 2 (possibly in the region of a magnet insert 45), passes into the region of the ball 12 (FIG. 1B). At the same time magnet 43 passes out of the region of the shaft 3 (into the region of a further magnet insert 46 which is perhaps provided), so that this magnet 43 no longer has any effect on the ball 12. Under the influence of the oppositely poled magnet 44 the ball 12 is drawn into the shaft 3, so that the thread extractor becomes operative. As FIG. 2 shows, the thread 11 is now sucked into the thread extractor. Catching on valves and the like is eliminated, as the closure portion in the form of the ball 12 is located outside the air passage 2 and further has no edges on which the thread 11 might catch. The risk of jamming of the thread does not therefore exist.

When the thread 11 is cut off and removed, the slide 42 is displaced in the guide 41 in the direction of arrow 48, wherein magnet 44 passes into the region of magnet insert 45 and magnet 43 into the region of the ball 12. The ball 12 is thus repelled and applied to the seat 22 under the influence of the suction air stream. In order to allow automatic opening of the device according to the invention in the absence of reduced pressure, e.g., when the machine is switched off, the slide 42 shown in FIG. 1 may also be constructed so as to be movable into an intermediate position, so that the force applied by the magnet 44 to the ball 12 is sufficient to attract the ball 12 on elimination of reduced pressure and to retain the ball 12 in the shaft when reduced pressure becomes effective again, but that force is insufficient to draw the ball 12 into the shaft 3 when reduced pressure is effective.

A device of this kind, as was described before, may be provided in any orientation. In order to achieve automatic opening of the air passage 2 when the machine is switched off, a mechanical solution is particularly advantageous wherein the air passage 2 is arranged essentially horizontally and the shaft 3 essentially vertically to provide gravity retaining means for the ball.

Figure 3:
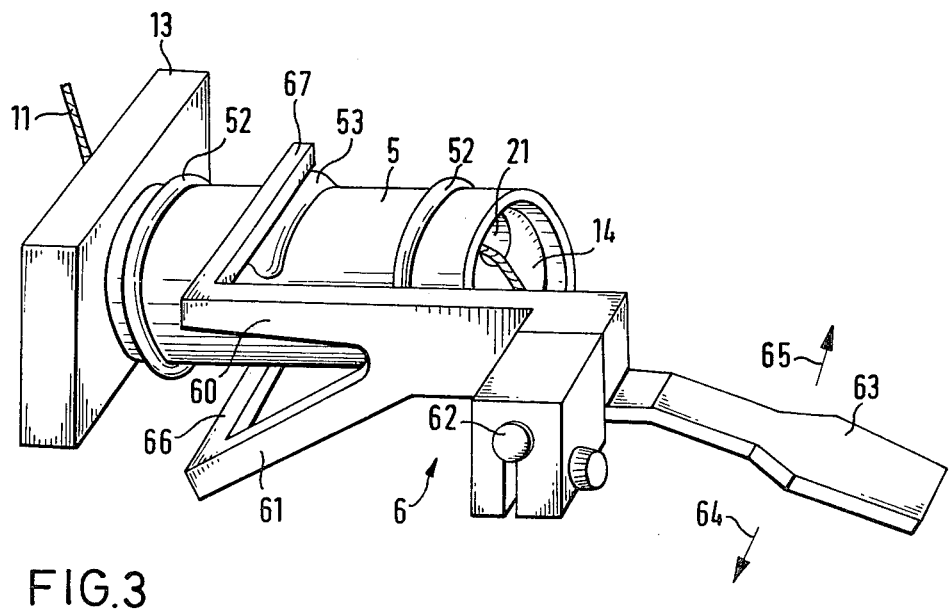
FIG. 3 shows the embodiment of FIG. 2 in perspective view with mechanical ball control means.

According to FIGS. 2 and 3, the housing 14 in which the air passage 2 is arranged eccentrically is constructed tubularly. The two portions of the housing 14, which are separated from each other by the shaft 3, are joined to each other only by lateral webs 15. The tubular housing 14 is surrounded by an elastic sleeve 5 which carries or forms the upper closure 50 and the lower closure 51 and which is retained on the housing 14 by locking rings 52. Two control levers 60 and 61 in the form of arms of a common switch lever 6 which is mounted pivotably on a shaft 62 are used as actuating means for the ball 12. Control lever 60 is located above closure 50 and control lever 61 below closure 51. On the side remote from the control levers 60 and 61, the switch lever 6 comprises an actuating arm 63.

If, after removal of the severed thread 11 by means of reduced pressure acting in the direction of arrow 1, the ball 12 is to be moved into the air passage 2, so that it is applied to the seat 22 and closes the thread extractor, short pivoting of the actuating arm 63 of the switch 6 in the direction of arrow 64 is sufficient. Control lever 61 acts in this way by means of its crossbar 66 through the elastic closure 51 on the ball and lifts the latter until it passes into the air stream flowing in the direction of arrow 1 and is pulled by the air stream into abutment with the seat 22. The thread extractor is consequently closed. If the actuating arm 63 is moved in the direction of arrow 65, the crossbar 67 of control lever 60 acts through elastic closure 50 on the ball 12 abutting the seat 22 and pushes it downwards into the shaft 3. As the ball 12 must be moved until it is out of the region of effect of the suction air stream, the actuating distance required is greater than during movement of the ball 12 into the suction air stream. So that closure 50 does not have to undergo excessive variations in shape, and in order to increase the durability of the closure 50 in this manner, this upper closure 50 comprises preferably a bulge 53 which is oriented outwards with respect to the shaft 3 or is in the form of this kind of bulge which can be inverted into the shaft 3 by control lever 60. This bulge 53 is constructed so as to invert itself outwards again automatically after release by the control lever 60.

On principle it is possible to construct the closures 4 and 40 or 50 and 51 as separate parts. Sleeve 5 which forms both closures 50 and 51 at the same time have however proved to be particularly advantageous, in particular with tubular housings 14 in forming elastic closures 50 and 51.

It is also possible to use two separate control levers instead of two control levers 60 and 61 joined together. It is however advantageous to join these control levers together controlwise in order to avoid simultaneous actuation of both control levers. By way of example, the control levers may be actuated electromagnetically, wherein the two control magnets are locked relative to each other electrically. The simplest and least delicate structurally however is an embodiment of the kind which was described above with the aid of FIGS. 2 and 3, in which the two control levers 60 and 61 are constructed as parts of a single switch lever 6, as controlwise connection is then provided automatically.

In order to avoid to a large extent friction with the walls of the shaft 3 on movement of the ball 12, in particular on opening of the thread extractor, the wall 30 facing towards portion 21 of the air passage 2 beneath the seat 22 is preferably receding, so that the shaft 3 widens downwardly.

Figure 4:
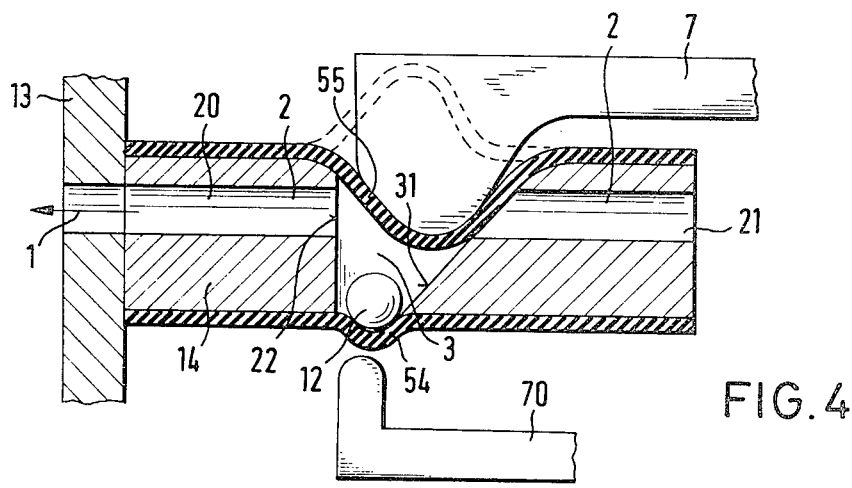
FIG. 4 shows a variation of the device shown in FIGS. 2 and 3 in section.

Another arrangement for this purpose, which may be provided independently or in combination with the receding wall 30, is shown in FIG. 4. In this embodiment the shaft 3 widens upwardly on its side 31 facing towards the first portion 20 of the air passage 2, wherein the upper closure 55 is constructed in the form of an outwardly inverted bulge which is so large that it can be moved by the upper control lever 7 into abutment with the end of the second portion 21 of the air passage 2 facing towards the shaft 3 and prevents throughflow of air. A device of this kind works twofold. Firstly, as described, the ball 12 is pushed away from the seat 22. Secondly, by closure of the second portion 21 of the air passage 2 an air current through the air passage 2 is prevented, so that the ball 12 cannot be pulled back into abutment with the seat 22 either. After release of pressure on the bulge-like closure 55, the latter is inverted outwards automatically again, so that this portion 21 of the air passage 2 is released again.

Closure of the air passage 2 takes place in the manner described by lifting of the ball 12 by means of a control lever 70.

In this case too it is again advantageous if the control levers 7 and 70 are joined together controlwise mechanically or otherwise.

The control levers 7 and 70 may, in the same way as the switch lever 6, be actuated directly by machine operation or indirectly via electromagnets, pneumatic or hydraulic cylinders and the like.

In order to be able to keep the housing 14 small, it is also possible to construct the lower closure 54 as an outwardly inverted bulge or to fit it with this kind of bulge.

The thread extractor according to the invention can be used on various textile machines. Its use in connection with an open-end spinning machine is described below. In machines of this kind it is usual to remove thread ends occurring in case of thread breakage pneumatically. For this purpose it is only necessary for the ball 12 to be moved downwards into the shaft 3 by actuation of the actuating means (slide 42 in the direction of arrow 47; control lever 6 in the direction of arrow 65), so that it frees the air passage 2. The operator can now introduce the thread 11 into the outer end of the air passage 2. When the thread section is removed, the actuating means (slide 42 in the direction of arrow 38; control lever 6 in the direction of arrow 64) is actuated again and the ball 12 is moved into the air stream acting in the air passage 2, whereby the ball 12 is applied to the seat. But even during bobbin changing or knotting the thread 11 delivered subsequently from the spinning station can be removed by the thread extractor until the thread is severed in the course of this operation. Opening and closing of the thread extractor can in the process also be synchronized with these procedures by suitable control of the thread extractor by the winding station or the knotting device.

When, upon starting open-end spinning machines, the threads are joined not automatically but by hand, and when the joining points are separated by knots, it is necessary as a rule to feed the threads temporarily to a thread extractor. Up till now it was necessary to this end to open the closures of the thread extractors by hand at all the spinning stations. The object of the invention on the contrary opens automatically, since the balls 12 are already falling into the shafts 3 when the spinning machine is switched off due to absence of reduced pressure, so that when the spinning machine is switched on again the thread extractors are already opened.

The device according to the invention is also advantageous insofar as the closure point, which is formed by the seat 22 and the ball 12, is located not at the outer end of the thread extractor, but inside it. Whereas namely the prior art thread extractors, which are closable at the outer end, can have an obtrusive effect on a passing thread, if for any reason this device is not closed perfectly, the device according to the invention remains practically free from this disadvantageous effect. If namely for any reason the ball 12 should not abut the seat 22 sealingly, the remaining air stream is distributed uniformly over the whole opening of portion 21 of the air passage 2, on account of which this air stream is no longer intensive enough to have a disadvantageous effect.

In order to ensure that the ball 12 can fall reliably into the shaft 3 in the absence of reduced pressure, and when oiling residues cling to the seat 22 or to the ball 12, an electromagnet (not shown) can also be associated with the lever 60 or 7, which forces the ball 12 into the shaft 3 when the machine is switched off or on.

While a preferred embodiment of the invention has been described using specific terms, such description is for illustrative purposes only, and it is to be understood that changes and variations may be made without departing from the spirit or scope of the following claims.

What is claimed is:

1. A controllable textile thread extractor device for use with a textile machine having an air passage connected to a vacuum source comprising:
   a shaft arranged generally perpendicular to said air passage dividing said air passage into first and second longitudinally aligned portions:
   a ball received in said shaft;
   said first portion connected at one end to said vacuum source;
   a seat for said ball formed at an opposing end of said first portion facing said shaft;
   said second portion having one end disposed adjacent a thread path on said textile machine through which said thread is received for extraction and an opposing end facing said shaft;
   said shaft extending in at least one direction beyond said air passage a distance at least generally corresponding to the dimension of the diameter of said ball and terminating to define first and second ends;
   closure means covering said shaft at said first and second ends;
   actuating means for causing said ball to move into a closed position abutting and seated on said seat and an open position wherein said ball is retained in said shaft off of said seat; and
   said air passage and said shaft being arranged in a housing and said closure means including an elastic closure forming a sleeve surrounding the housing.

2. The device according to claim 1 wherein said air passage is arranged eccentrically in a tubular housing which is traversed completely by said shaft.

3. The device of claim 1 including retaining means for retaining said ball in said open position.

4. The device according to claim 3 characterized in that said air passage is arranged essentially horizontally and said shaft essentially vertically and said retaining means is provided by said ball being retained in the lower vertical portion of said shaft beyond said air passage by means of gravity.

5. The device of claim 1 wherein said elastic closure closes said first and second ends defining first and second closures, and said actuating means includes a first control lever which can be brought into operation on said ball through said first closed end and a second control lever which can be brought into operation on said ball through said second closed end.

6. The device according to claim 5 wherein said first and second control levers are connected to each other controlwise.

7. The device according to claim 5 wherein said first closure means includes an elastic bulge which is directed outwardly with respect to said shaft and which is invertible into said shaft by said actuating means.

8. The device according to claim 5 wherein said shaft widens upwardly on a side facing towards said first portion of said air passage and said elastic bulge can be deformed and brought into abutment with the end of said second portion of said air passage facing towards said shaft during inversion.

9. A controllable textile thread extractor device for use with a textile machine having an air passage connected to a vacuum source comprising:
   a shaft arranged generally perpendicular to said air passage dividing said air passage into first and second longitudinally aligned portions;
   a ball received in said shaft;
   said first portion connected at one end to said vacuum source;
   a seat for said ball formed at an opposing end of said first portion facing said shaft;
   said second portion having one end disposed adjacent a thread path on said textile machine through which said thread is received for extraction and an opposing end facing said shaft;
   said shaft extending in at least one direction beyond said air passage a distance at least generally corresponding to the dimension of the diameter of said ball and terminating to define first and second ends;
   closure means covering said shaft at said first and second ends;
   actuating means for causing said ball to move into a closed position abutting and seated on said seat and an open position wherein said ball is retained in said shaft off of said seat;
   a housing in which said air passage and said shaft are arranged;
   said housing and said closure means being of nonmagnetizable material and said ball having a predetermined polarization;
   said actuating means including a slide member being slidable parallel to said air passage and bearing two magnets, one magnet influencing said ball in one end position of said slide member and said other magnet influencing said ball in the other end position of said slide member;
   one of said magnets having a polarization opposite to that of said ball in order to attract said ball into said shaft until is lies outside of the air stream acting in said air passage; and
   the other of said magnets having a polarization equal to that of said ball in order to repell said ball into the region of the air stream acting in said air passage, and to move said ball onto abutment with said seat.

* * * * *